United States Patent
Shaffer et al.

(10) Patent No.: US 6,501,750 B1
(45) Date of Patent: *Dec. 31, 2002

(54) METHOD AND DEVICE FOR DEVICE-TO-DEVICE ENABLEMENT OF CAMP-ON CAPABILITY

(75) Inventors: Shmuel Shaffer, Palo Alto, CA (US); William Joseph Beyda, Cupertino, CA (US)

(73) Assignee: Siemens Information & Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,427

(22) Filed: Jun. 5, 1998

(51) Int. Cl.[7] .............................................. H04L 12/66
(52) U.S. Cl. ....................... 370/352; 370/401; 370/522; 379/88.17; 709/250
(58) Field of Search ................................ 370/278, 259, 370/401, 352, 522; 379/201, 164, 220, 309, 88.17, 93.01, 93.05, 93.07; 709/201, 203, 250

(56) References Cited

U.S. PATENT DOCUMENTS

| | | | |
|---|---|---|---|
| 3,679,835 A | * 7/1972 | Gueldenpfenig et al. | 379/209.01 |
| 3,936,613 A | * 2/1976 | Nishigori | 179/18 BG |
| 4,991,203 A | * 2/1991 | Kakizawa | 379/209 |
| 5,263,084 A | 11/1993 | Chaput et al. | 379/215 |
| 5,268,957 A | * 12/1993 | Albrecht | 379/67 |
| 5,408,468 A | * 4/1995 | Petersen | 370/58.2 |
| 5,577,111 A | 11/1996 | Iida et al. | 379/209 |
| 5,724,412 A | 3/1998 | Srinivasan | 379/93.23 |
| 5,937,046 A | * 8/1999 | Lee | 379/156 |
| 6,078,581 A | * 6/2000 | Shtivelman et al. | 370/352 |
| 6,081,725 A | * 6/2000 | Ishida | 455/462 |
| 6,141,328 A | * 10/2000 | Nabkel | 370/259 |
| 6,144,667 A | * 11/2000 | Doshi | 370/401 |
| 6,160,881 A | * 12/2000 | Beyda et al. | 379/209 |

* cited by examiner

Primary Examiner—Alpus H. Hsu
Assistant Examiner—Roberta A. Stevens

(57) ABSTRACT

A notification method for providing camp-on capability includes utilizing device-to-device signal exchanges via a data network. As a result, the camp-on capability may be enabled at a called communication device by means of a signal sent from a calling communication device. In the preferred embodiment, the data network is the global communications network referred to as the Internet, but this is not critical. As a response to the determination that the called communication device, such as the telephone, is in an unavailable condition, a first notification signal is transmitted from a calling communication device to the unavailable called device. The first notification signal may be an application program that is automatically executed at the called device. Alternatively, the first notification signal may be a special protocol element that triggers execution of a camp-on program stored at the called device. The first notification signal includes the network address of the calling device. When the executed program determines that the called communication device is available to receive an incoming call, a second notification signal is transmitted to the original calling device. In response, the original calling device reinitiates the process of establishing connectivity with the called device.

14 Claims, 4 Drawing Sheets

METHOD AND DEVICE FOR DEVICE-TO-DEVICE ENABLEMENT OF CAMP-ON CAPABILITY

BACKGROUND OF THE INVENTION

The invention relates generally to exchanging telephony signals between communication devices of a data network and more particularly to methods and devices for providing camp-on capability.

DESCRIPTION OF THE RELATED ART

There are a number of available telephony features for reducing the inconvenience associated with attempting to contact a person at a telephone or other communication device that is presently unavailable for receiving an incoming call. Typically, the unavailable condition is a result of the telephone being in an off-hook state. One available feature is voicemail capability. The calling party is transferred to a voicemail system that records a message from the calling party for later access by the called party. The message may be information or may be a request for a return call. The voicemail system may be located at the facility of the called telephone, such as the private branch exchange (PBX) of a corporation, or may be located at a central office of a public switched telephone network (PSTN). Acquiring voicemail capability through the central office typically requires a subscriber to pay an amount beyond the basic subscriber fee.

A second available feature is call waiting. This feature is described in U.S. Pat. No. 5,263,084 to Chaput et al. A subscriber who is engaged in a telephone conversation when a second incoming call is received will be notified with a call-waiting tone, typically a 440 Hz tone. The called subscriber then has the option of performing a switch-hook flash that places the original call on hold, while the second incoming call is connected to the called subscriber. When acquired through the central office of a PSTN, the call-waiting feature requires an amount beyond the basic subscriber fee.

A third available feature is referred to as camp-on, and is described in U.S. Pat. No. 5,577,111 to Iida et al. When a calling telephone or other communication device calls a second communication device that is in an off-hook state, an exchange system registers the numbers of the two devices. The exchange system monitors the connection of the called communication device. Upon detection that the called communication device is in an available condition, the system establishes connectivity between the two communication devices. The camp-on feature renders it unnecessary for the calling party to repeatedly redial the called party until the connection is established. Instead, the connection is made immediately after the off-hook communication device is available. However, the capability is limited. Signaling between telephone networks allows camp-on callback capability only when the networks are intelligent and bound by a common protocol. For example, if multiple PBXs are provided by a common vendor or all support a common protocol (e.g., the same version of ISDN), camp-on is enabled for communication devices supported by the PBXs. For individual or business subscribers, the camp-on feature often is restricted to a limited geographical area and requires a per-call or monthly additional fee.

In addition to telephone calls over voice networks, data networks may be used to provide connectivity between communication devices. The global data network referred to as the Internet is available for establishing connectivity among communication devices. The communication devices may be personal computers having dialer clients or may be Internet phones that provide analog or digital phone service combined with Internet access (e.g., the Internet Screen Phone sold by Alcatel, which merges Internet access with conventional telephone connectivity in an integrated phone set, screen and keyboard connected to a telephone network). Phone communications via a data network may be achieved using an Applications Programming Interface (API), such as Microsoft Corporation's Telephone API (TAPI). An API is used to bridge the gap between telephony requirements and data network-based techniques for managing and transmitting data. One API that is designed to achieve particular telephone call control objects across the various computer platforms utilizes the object-oriented programming language referred to as Java, which was originally developed by Sun Microsystems. The Java Telephony API combines Internet and telephony technology components in a platform-independent application.

U.S. Pat. No. 5,724,412 to Srinivasan describes a method and system for providing a telephony subscriber with Internet information related to a caller attempting to call the subscriber. The Internet information may be the identification of the caller. The information is provided to the equipment of the subscriber during the first and second ring of an incoming call. If the called subscriber elects not to answer the call or is not present during the incoming call, the Internet information may be stored for later access. For example, the Internet information may be stored with a voicemail message. The Internet information may be presented to the subscriber in one or more of different forms, e.g., all text, all vocalized in speech, or a combination of text and vocalized speech. The capabilities are achieved using a combination of hardware and software, which may be at a telephony central office or the premises of the called subscriber. That is, an aspect of the method and system is that the called party's Internet phone call processing system must be modified to accept and utilize caller Internet identification information provided by the local telephony provider.

Thus, while there have been numerous advances in the industry, call-handling features for reducing the inconvenience of attempting connectivity with a communication device in an unavailable condition continues to require specifically designed hardware and/or software adjunct to the unavailable device. The specifically designed hardware/software may be at the central office of the provider or at a corporate switching system (e.g., PBX) that supports call-handling to the unavailable communication device. In either of these situations, the calling feature is available only at a fee.

What is needed is a cost-efficient method and device for enabling a call-handling feature that is accessed when a called communication device is in an unavailable condition.

SUMMARY OF THE INVENTION

A device and a notification method utilize device-to-device signal exchanges via a data network to enable camp-on capability. As a response to a determination that a called communication device is in an unavailable condition (e.g., an off-hook state), a first notification signal is transmitted from a calling communication device to the unavailable called communication device. The first notification signal is transmitted via the data network and includes a network address of the calling communication device. The first notification signal is configured to automatically trigger a transmission of a second notification signal when the unavailable called communication device returns to an available condition to receive the call. The second notification signal is transmitted in a direction opposite to the first notification signal, i.e., from the called device to the originally calling device. After receiving the second notification signal from the called device, the call is reinitiated. Thus, the camp-on capability is available without purchasing specifically designed equipment and without registering for camp-on service.

In the preferred embodiment, the data network is the Internet and the communication devices are Internet-enabled devices, such as personal computers. The first notification signal is stored in memory of the called communication device for access when the called communication device switches from the unavailable condition to the available condition. Also in the preferred embodiment, the first notification signal is formatted as an application program that is specific to directing contact between the called and calling communication devices when the called communication device returns to the available condition. For example, if the two devices are computers having dialer clients that operate in a Java Telephony API environment, the first notification signal may be a Java applet. The application program may run in an executed mode that monitors the availability condition of the called communication device. Detection that the called device is in the available condition triggers the transmission of the second notification signal.

In the embodiment in which the first notification signal is an application program, the called communication device need only be enabled to execute the program. Consequently, if the application program is executable regardless of operating system platform, the called communication device is camp-on ready even though it may not previously have been programmed to provide this feature. One potential platform-independent environment is a Java applet.

As an alternative to transmitting the first notification signal as an application program, the signal may be a specifically designed protocol element that is sent from the calling communication device to the called communication device. Both of the devices may have camp-on reception software that is responsive to the protocol element. The protocol element includes the data network address of the calling communication device and is configured to trigger the transmission of the second notification signal upon a determination that the called communication device has returned to an available condition.

As previously noted, the second notification signal is transmitted from the originally called communication device to the originally calling communication device. This signal may also be an application program, such as a Java applet. Alternatively, the signal is a special protocol element. The second notification signal may be configured to provide a visual display of the available status of the called communication device, or may be configured to automatically execute a reinitiation of the call to the called communication device.

While not critical, the first notification signal may trigger a display at the called communication device. The display may be executed at the time that the user is engaged in the call that causes the called communication device to be unavailable. The display allows the called party to refuse the request for camp-on capability, so that the second notification signal is not sent. Alternatively, the called party has the opportunity to immediately hang up, so that the incoming call is connected.

The communication devices are preferably Internet-enabled devices having dialer interfaces for establishing telephonic connections via the Internet. Each device is preferably a computer having the ability to detect a busy condition at a called remote Internet-enabled device and having the camp-on capability of transmitting the first notification signal to the unavailable device in response to recognizing a busy condition. The original calling device has a monitoring capability for activating the dialer interface to contact the previously unavailable device in response to detecting the second notification signal that indicates that the remote device is available. The notification signals include the Internet Protocol (IP) address of the sending device. Both of the notification signals are transmitted from one device to the other device. Preferably, at least the first notification signal is an application program, but special protocol elements may be used.

DETAILED DESCRIPTION

Figure 1:
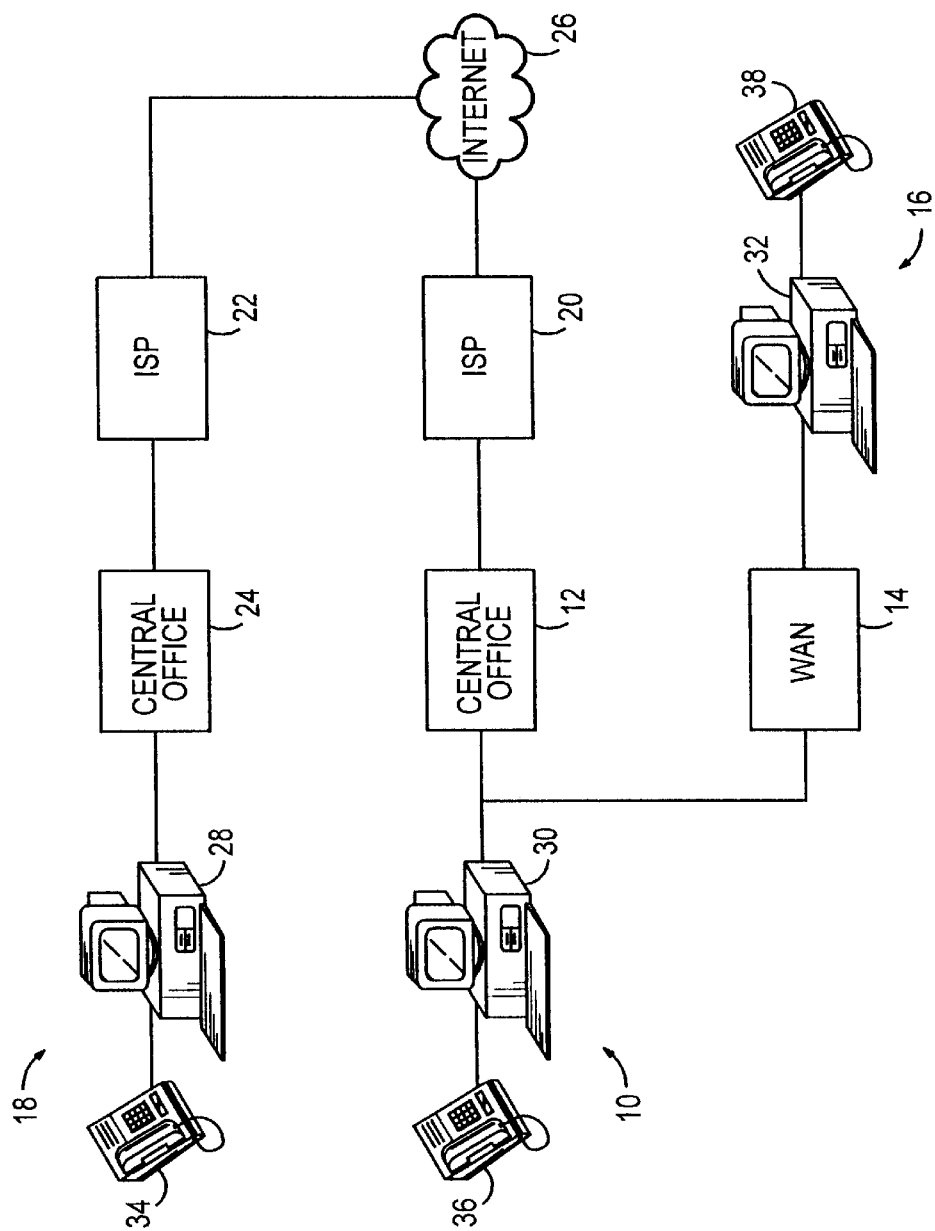
FIG. 1 is a block diagram of a possible network topography for implementing a camp-on method in accordance with the invention.

With reference to FIG. 1, a topography for providing device-to-device communications for enabling camp-on capability is shown as including a first communication device 10 connected to a central office 12 of a public switched telephone network and to a wide area network (WAN) 14. The communication device 10 is able to receive and direct calls to a second communication device 16 via the WAN 14, which is a data network. In the topography of FIG. 1, telephony over a data network is also possible in a call to a third communication device 18. A call directed to the third communication device from the first communication device utilizes a first Internet service provider (ISP) 20, a second ISP 22 and a second central office 24. As is well known in the art, the ISPs 20 and 22 enable connections over the global communications network referred to as the Internet 26.

In the embodiment of FIG. 1, the first and third communication devices 10 and 18 subscribe to different ISPs 20 and 22. However, this is not critical. The two devices may be subscribed to a single ISP. Moreover, the devices 10 and 18 may be connected to the same central office 12 or 24. However, an advantage of the invention is that camp-on capability does not require a high degree of compatibility. That is, camp-on services are not restricted to communication devices within a limited area, or to communication devices that use the same operating system platform, or to communication devices that use the same transmission standard (e.g., ISDN). For example, the first communication device 10 may be connected to the central office 12 using one version of ISDN, while the third communication device 18 may be connected to the central office 24 using a different version of ISDN or using an analog line (since the detection of an off-hook condition does not require digital signaling). In the preferred embodiment, the compatibility between transmission standards is not an issue, since an application program, such as an applet, is sent from a calling device to a called device via user channels (e.g., B-channels of an ISDN line), rather than telephony signaling channels (e.g., D-channels of the ISDN line). In this preferred embodiment, compatibility between the platforms of the devices is not critical, if the transmitted application program is platform independent. For example, the application program may be a Java applet.

In the embodiment illustrated in FIG. 1, each of the communication stations 10, 16 and 18 includes a computer 28, 30 and 32 and a telephone 34, 36 and 38. However, other embodiments are contemplated. For example, the telephones may be deleted at one or all of the communication devices if the resources of the computers are used to enable telephony. Thus, a sound card of a computer may be used to drive a microphone and an internal or external speaker or a headset. As another alternative, the communication devices may be Internet phones that provide analog or digital phone service combined with Internet access (e.g., the Internet Screen Phone sold by Alcatel, which merges Internet access with conventional telephone connectivity in an integrated phone set, screen and keyboard connected to a telephone network).

Figure 2:
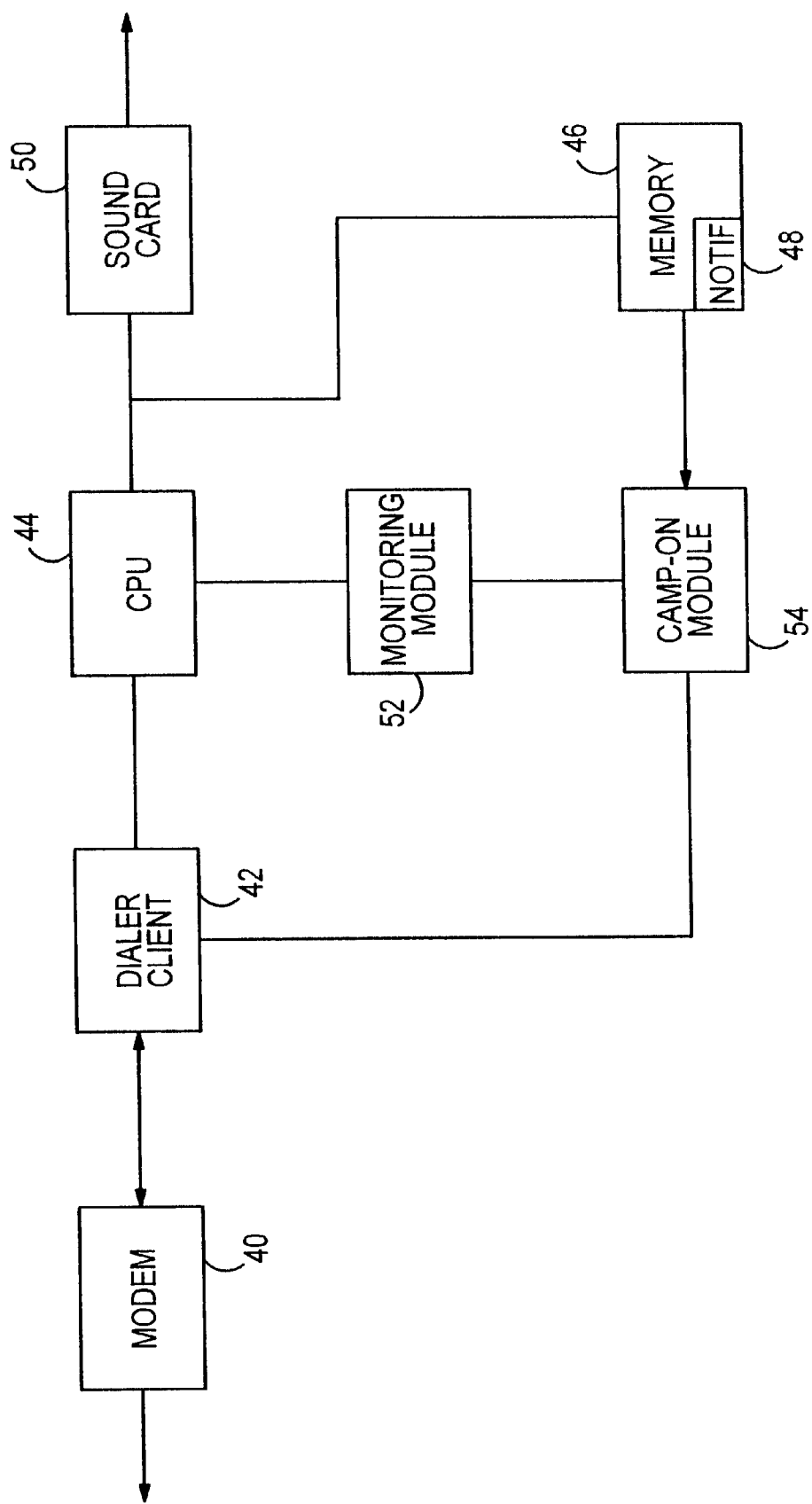
FIG. 2 is a block diagram of a network-enabled device having components for providing the camp-on capability for the network of FIG. 1.

The components of one embodiment of a communication device are shown in FIG. 2. A modem 40 is connected to a dialer client 42 to allow the communication device to communicate with other devices on a data network. The modem may be an ISDN adapter, rather than a modulator/demodulator. The configuration of the dialer client is not critical to the invention. Typically, dialer clients are implemented in computer software.

The operations of the communication device are controlled by a central processing unit (CPU) 44. Application programs and data are stored in memory 46. The memory includes information 48 for generating first notification signals of the type to be described below. If the communication device includes a stand-alone computer, i.e., does not include an adjunct telephone, a sound card 50 is used in the input and output of voice data.

A monitoring module 52 and a camp-on module 54 enable camp-on capability. The modules 52 and 54 may be computer software, or may be a combination of computer software and hardware. For example, a camp-on card may be added to a conventional computer to provide the capability. The standard components of a computer that are not relevant to the camp-on capability are not shown in FIG. 2.

Figure 3:
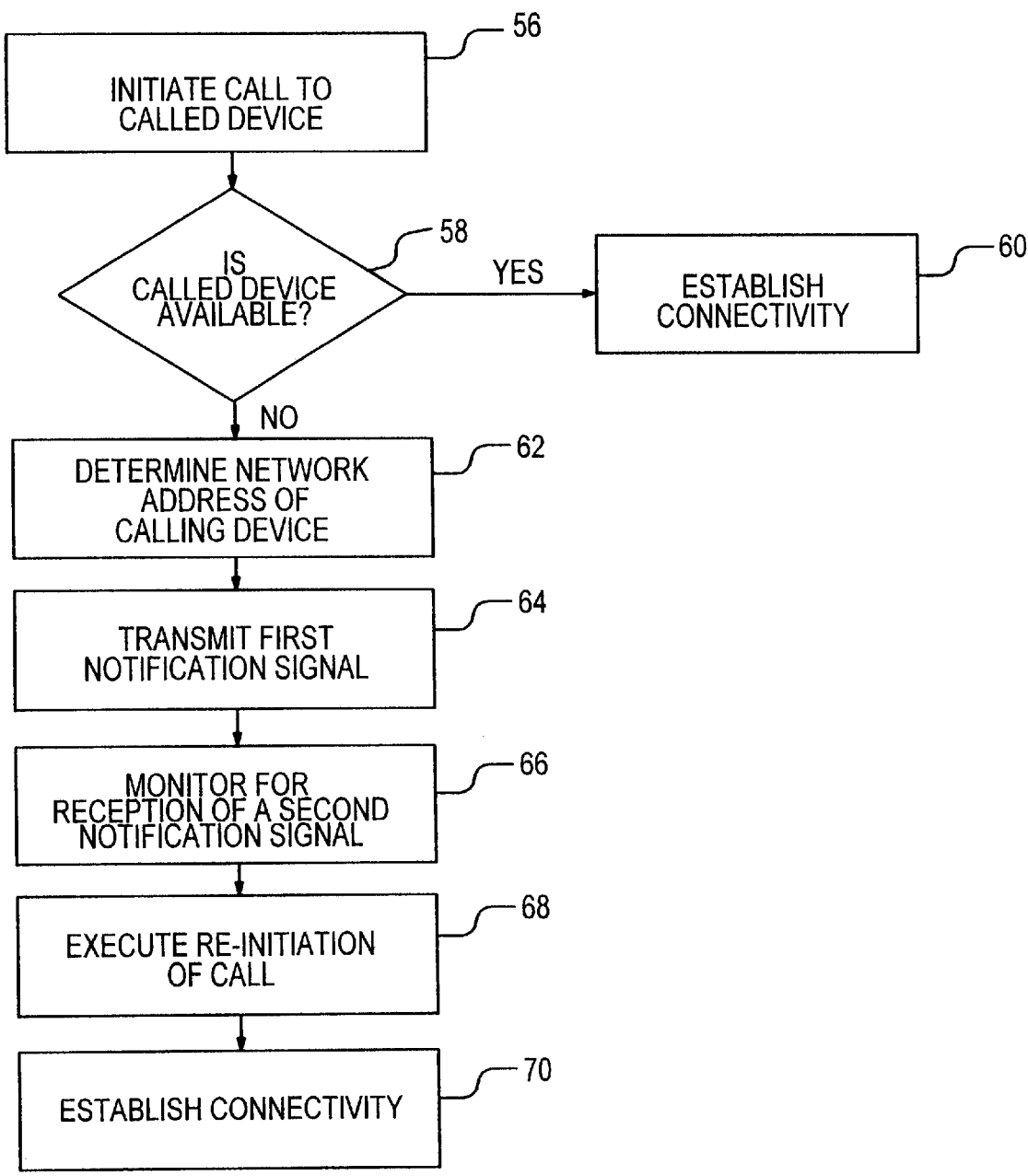
FIG. 3 is a process flow of steps that occur at a calling communication device to provide the camp-on capability.

The steps for remotely enabling camp-on capability are shown in FIG. 3. For purposes of discussion, it will be assumed that the first communication device 10 of FIG. 1 is a calling device and the third communication device 18 is the called device. However, the operation is identical if the roles are reversed. Moreover, the called device may be the second communication device 16, which does not require connection via the Internet 26. Instead, the data network referred to as the WAN 14 is utilized.

In step 56, the calling communication device 10 initiates a call to the called communication device 18. Decision step 58 is a determination of whether the called device is available to receive the call. Conventional telephony protocol elements (i.e., signals) are used in this decision step 58. If the called device is available, telephony connectivity is established at step 60. A determination that the called device is unavailable is typically a result of the called device being engaged in a prior telephone call. That is, the called device is in a busy state.

If it is determined that the called communication device 18 is unavailable, the data network address of the calling communication device 10 is determined at step 62. This step is executed at the calling device 10. In an Internet application, the dialer client 42 of FIG. 2 may determine that the called device is unavailable by receiving a conventional Telephony API message from the called device. By associating reception of the API message with a step of generating a first notification signal, the process may be automated. When the calling device 10 has an assigned permanent address, such as an Internet Protocol (IP) address, the step 62 is executed internally (e.g., using dialer client software) and the network address is embedded into the first notification signal. For some ISPs, network addresses are dynamically assigned. In this case, the dynamic network address may be determined by interrogating the ISP or a registration table of an associated server. This interrogation may be executed using dialer client software. Again, the address is embedded into the first notification signal.

In step 64, the first notification signal is transmitted from the calling communication device 10 to the temporarily unavailable called communication device 18. As previously noted, the first notification signal is preferably an application program that is platform independent. In this embodiment, the camp-on capability is enabled even when the remote called device 18 has not been programmed to provide camp-on service. For example, the program application may be an applet that is immediately executed at the called communication device and that monitors the telephony resources of the called device to determine when the device is available to receive an incoming call. The applet may be further configured to automatically trigger transmission of a second notification signal to the originally calling communication device 10, thereby notifying the device of the availability called device. Thus, in step 66, the transmission of the first notification signal is followed by a step of monitoring for reception of the second notification signal. The monitoring module 52 of FIG. 2 is used to execute this step.

As an alternative to the transmission of the first notification signal as an application program, the signal may be a special protocol element that is transmitted as a data message. Typically, this embodiment requires that the receiving communication device 18 include hardware or software that triggers the transmission of a second notification signal upon determining that the device is available to receive an incoming call. The monitoring module 52 of FIG. 2 may be used to detect the special protocol element when the communication device that includes the monitoring module is engaged in an ongoing call at the time that a second incoming is attempted. The monitoring module 52 then triggers the camp-on module 54 to transmit a second notification signal when the communication device is available to receive the second incoming call.

At step 68, the reception of the second notification signal triggers a reinitiation of the call. Preferably, the second notification signal includes the network address of the originally called communication device 10. Thus, if multiple unsuccessful attempts are made to initiate calls to different communication devices, the second notification signal will include the information necessary to determine which call should be reinitiated.

In the preferred embodiment, the reinitiation step 68 is an automated step. That is, the reception of the second notification signal causes the second call to be attempted in a manner that is transparent to the calling individual. However, in some embodiments, the availability of the called communication device 18 is displayed to the calling individual or is indicated by means of an audio signal, allowing the individual to determine whether the step 68 should be implemented. If so, step 70 establishes connectivity between the calling communication device 10 and the called communication device 18. The connectivity is provided using standard techniques for setting up a call from one device 10 to another device 18.

As previously noted, the steps of FIG. 3 may be implemented when the call is made via the WAN 14, rather than the Internet 26. The protocol will be different, but the operations will be substantially identical.

Figure 4:
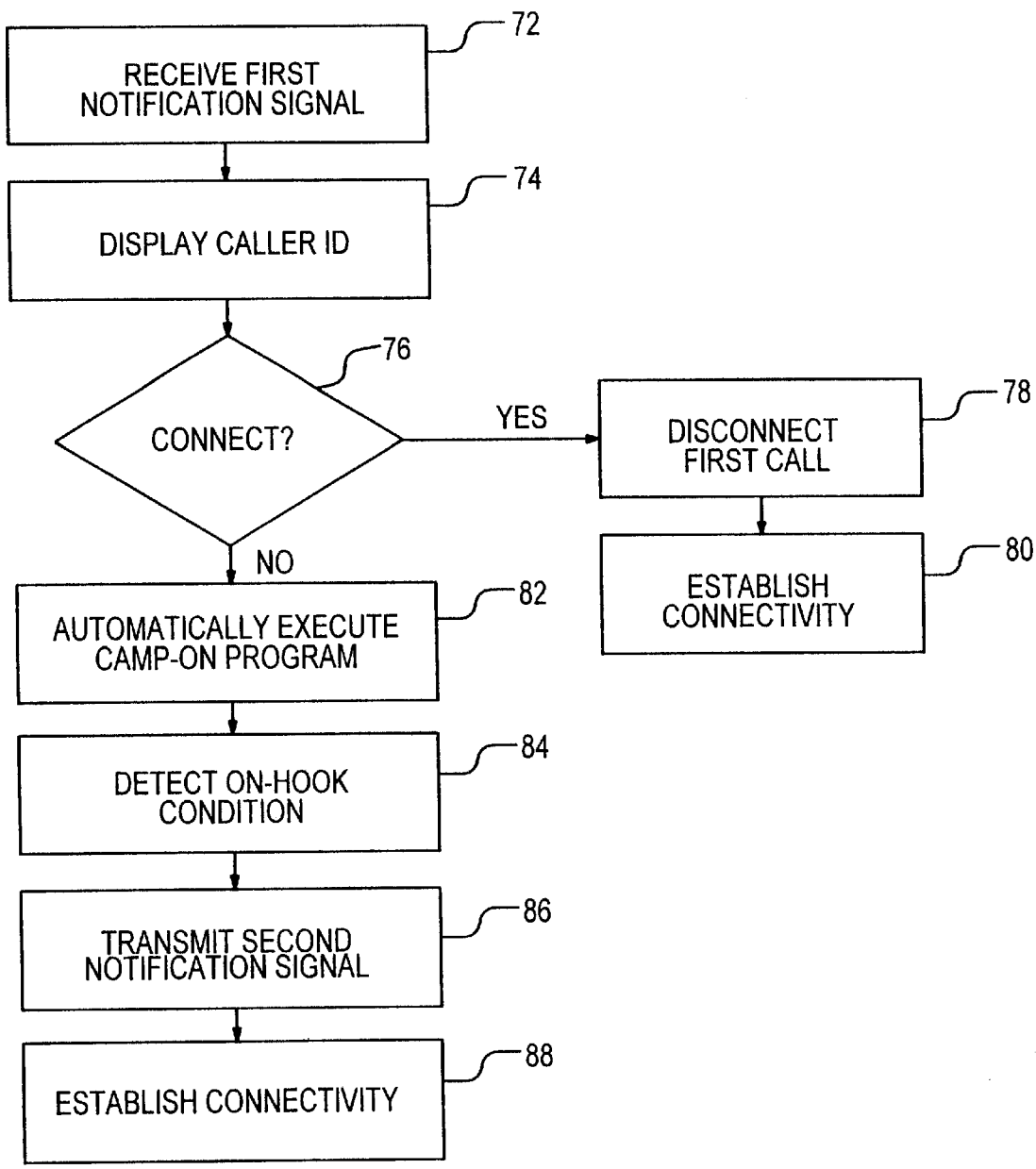
FIG. 4 is a process flow of steps that occur at a called communication device to provide the camp-on capability.

Returning to the example in which the called communication device is the device 18 that is contacted via the Internet 26, FIG. 4 illustrates the steps that are executed at the called communication device 18. The temporarily unavailable device 18 receives the first notification signal from the calling communication device 10, as shown at step 72. If the first notification signal is an application program that is automatically executed to monitor the availability of the called device, the process begins immediately. Steps 74 and 76 are optional steps. In an embodiment that includes the optional steps, the caller identification is displayed to the individual who is engaged in the original call. This display step 74 enables the called individual to determine whether the call has a sufficient importance to terminate the first call and connect the incoming call. A positive response to the decision step 76 is followed by a disconnection of the first call at step 78 and by a step 80 of establishing connectivity to the incoming call.

While not shown in FIG. 4, the optional steps 74 and 76 may include enabling the called individual to discard the camp-on process. Thus, if the called individual elects not to notify the calling individual of the subsequent availability of the communication device, the transmission of the second notification signal may be disabled.

A decision at step 76 that immediate connectivity is not desired, but subsequent connectivity is, triggers the automatic execution of the camp-on program at step 82. The camp-on program may be the first notification signal received from the calling communication device 10. For example, the first notification signal may be a Java applet that enables camp-on capability at the called device 18. Alternatively, the camp-on program may be stored in memory at the called device and may be automatically executed by receiving the first notification signal as a special protocol element. In step 84, the camp-on program detects an on-hook condition at the called communication device. This on-hook condition indicates that the called communication device is available to receive the incoming call. In response to step 84, the second notification signal is transmitted at step 86. This second notification signal triggers the actions described with reference to FIG. 3. Consequently, connectivity is established at step 88.

Optionally, a timing step may be added to the process for occasions in which the called party leaves the area of the called communication device upon termination of the first call. For example, if the called party is temporarily missing while on a short errand, periodic attempts to reinitiate the call will result in a completion of the call at step 88. The attempts may be triggered in intervals of m minutes (e.g., m=5) for a maximum of n times (e.g., n=4).

As will be understood by persons skilled in the art, the steps of FIG. 4 apply equally if the called communication device is contacted via the WAN 14, rather than the Internet 26.

What is claimed is:

1. A notification method of exchanging call signals between communication devices via a data network comprising steps of:

initiating a call from a calling communication device to a called communication device;

in response to a determination that said called communication device is in an unavailable condition for receiving said call, initiating a camp-on capability that is executable by said called communication device, including transmitting a first notification signal directly from said calling communication device to said called communication device, said first notification signal being configured to automatically trigger a second notification signal that is transmitted directly from said called communication device to said calling communication device when said called communication device is in an available condition to receive said call, said first notification signal including a network address of said calling communication device;

formatting said first notification signal such that said first notification signal is stored In memory of said called communication device for access when said called communication device switches from said unavailable condition to said available condition; and after receiving said second notification signal from said called communication device, reinitiating said call from said calling communication device to said called communication device;

thereby providing said camp-on capability using direct device-to device signal exchanges.

2. The method of claim 1 further comprising a step of formatting said first notification signal such that said first notification signal is stored in memory of said called communication device for access when said called communication device switches from said unavailable condition to said available condition.

3. The method of claim 2 further comprising a step of receiving said second notification signal as a second application program that is specific to providing contact between said calling and called communication devices.

4. The method of claim 1 wherein said step of transmitting said first notification signal includes sending a protocol element, said called and calling communication devices being personal computers.

5. The method of claim 1 wherein said steps of initiating said call and transmitting said first notification signal include utilizing the Internet, said first notification signal including an IP address of said calling communication device.

6. The method of claim 1 further comprising a step of forming said first notification signal such that an identity of said calling communication device is displayed at said called communication device while said called communication device is in said unavailable condition, said unavailable condition being a busy condition.

7. The method of claim 1 wherein said step of reinitiating said call is executed automatically upon receiving said second notification signal.

8. A method of exchanging call signals between communication devices via a data network comprising steps of:

utilizing a dialer client of a first Internet-enabled device to direct a call to a second Internet-enabled device via the Internet;

detecting a busy condition of said second Internet-enabled device as a response to said directed call; and enabling a device-to-device camp-on feature at said second Internet-enabled device by transmitting an application program from said first Internet-enabled device to said second Internet-enabled device, said application program being an applet that is stored in memory at said second Internet-enabled device that is in said busy condition, said applet being specific to automatically generating an Internet communication from said second Internet-enabled device to said first Internet-enabled device when said busy condition at said second Internet-enabled device is terminated.

9. The method of claim 8 further comprising a step of enabling an automatic call to said second Internet-enabled device as an automated response to said Internet communication from said second Internet-enabled device.

10. The method of claim 9 wherein said Internet communication includes a second application program, said second application program being specific to executing said automatic call to said second Internet-enabled device.

11. The method of claim 8 wherein said step of utilizing said client dialer includes accessing resources of a first personal computer to initiate a telephone call to a second personal computer, said first and second personal computers being said first and second Internet-enabled devices, respectively.

12. The method of claim 8 further comprising a step of enabling display of an identification of said call as a response to said step of detecting said busy condition, said identification being presented at said second Internet-enabled device.

13. An Internet-enabled device comprising:

a dialer interface contained within a personal computer for establishing telephonic connections via the Internet;

detector means contained within said personal computer for recognizing a busy condition at a remote Internet-enabled device to which said dialer interface is used to direct a call;

camp-on means, responsive to said detector means, for transmitting a first notification signal as an application program from said personal computer to said remote Internet-enabled device in response to a recognition of said busy condition, said first notification signal having a configuration to automatically trigger transmission of a second notification signal from said remote Internet-enabled device to said personal computer upon termination of said busy condition, said personal computer and said remote Internet-enabled device being user-dedicated devices; and monitor means for activating said dialer interface to contact said remote Internet-enabled device as an automated response to detecting a reception of said second notification signal.

14. The device of claim 13 wherein said camp-on means is coupled to memory for storing said first notification signal, said first notification signal including an Internet Protocol address for activating said dialer interface.

* * * * *